United States Patent [19]

Parker

[11] Patent Number: 4,487,224
[45] Date of Patent: Dec. 11, 1984

[54] AIR SWITCH AND FILTER COMBINATION

[75] Inventor: Oscar E. Parker, Glen Burnie, Md.

[73] Assignee: Pace Incorporated, Laurel, Md.

[21] Appl. No.: 361,544

[22] Filed: Mar. 24, 1982

[51] Int. Cl.³ .............................................. F17D 3/01
[52] U.S. Cl. ............................. 137/569; 137/625.21;
  137/625.46; 417/440
[58] Field of Search ........................ 417/440, 315, 236;
  137/569, 625.46, 625.21; 251/287

[56] References Cited

U.S. PATENT DOCUMENTS

| | | | |
|---|---|---|---|
| 241,002 | 5/1881 | Hamilton | 417/315 |
| 2,994,341 | 8/1961 | Leopold | 251/287 X |
| 3,279,745 | 10/1966 | Christenson | 137/625.47 X |
| 3,836,288 | 9/1974 | Evans | 417/440 X |
| 4,171,711 | 10/1979 | Bake | 251/283 X |

Primary Examiner—Martin P. Schwadron
Assistant Examiner—Stephen M. Hepperle
Attorney, Agent, or Firm—Gerald J. Ferguson, Jr.; Joseph J. Baker

[57] ABSTRACT

An air switch comprises a switch body having a recess thereon and a switching member having an output connection port. The recess is connected to vacuum and pressure outlets through passages in the switch body. The vacuum passage is connected to a port on the wall of the recess while the pressure passage is connected to a partially circularly extending channel on the recess wall. The switching member is rotatably received in the recess and includes a radially extending channel on its inner wall. Positioning of the switching member in the vacuum or pressure modes places the member channel in fluid communication with either the vacuum port or the channel on the recess wall. When in the vacuum mode, the pressure channel is vented to the atmosphere and when in the pressure mode, the vacuum is similarly vented. When in the minimum pressure mode, a portion of the pressure is vented to the atmosphere although this pressure venting is reduced to zero when the switching member is in the maximum pressure mode. In a preferred construction, the switch is operable only when a vacuum filter connects the source of vacuum to the switch body.

12 Claims, 12 Drawing Figures

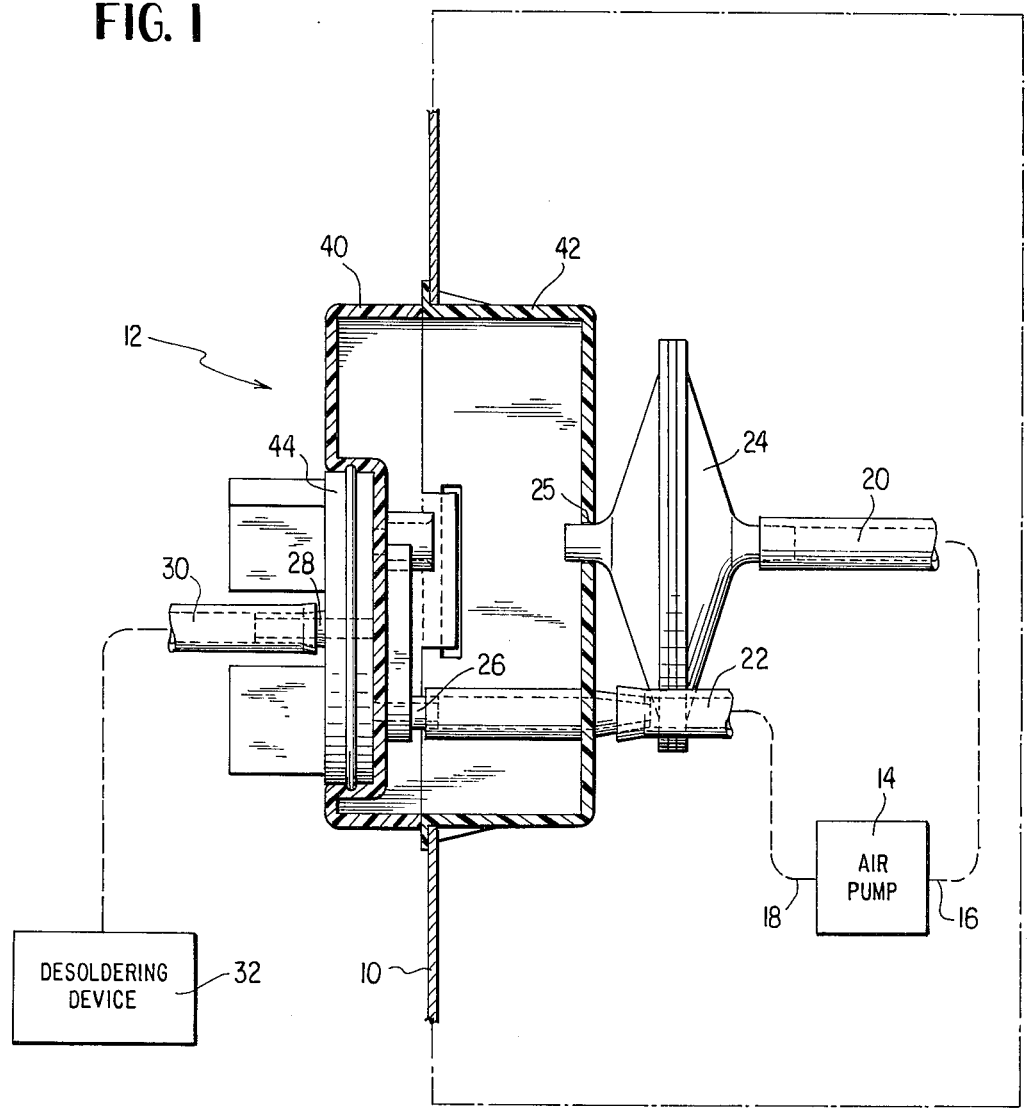

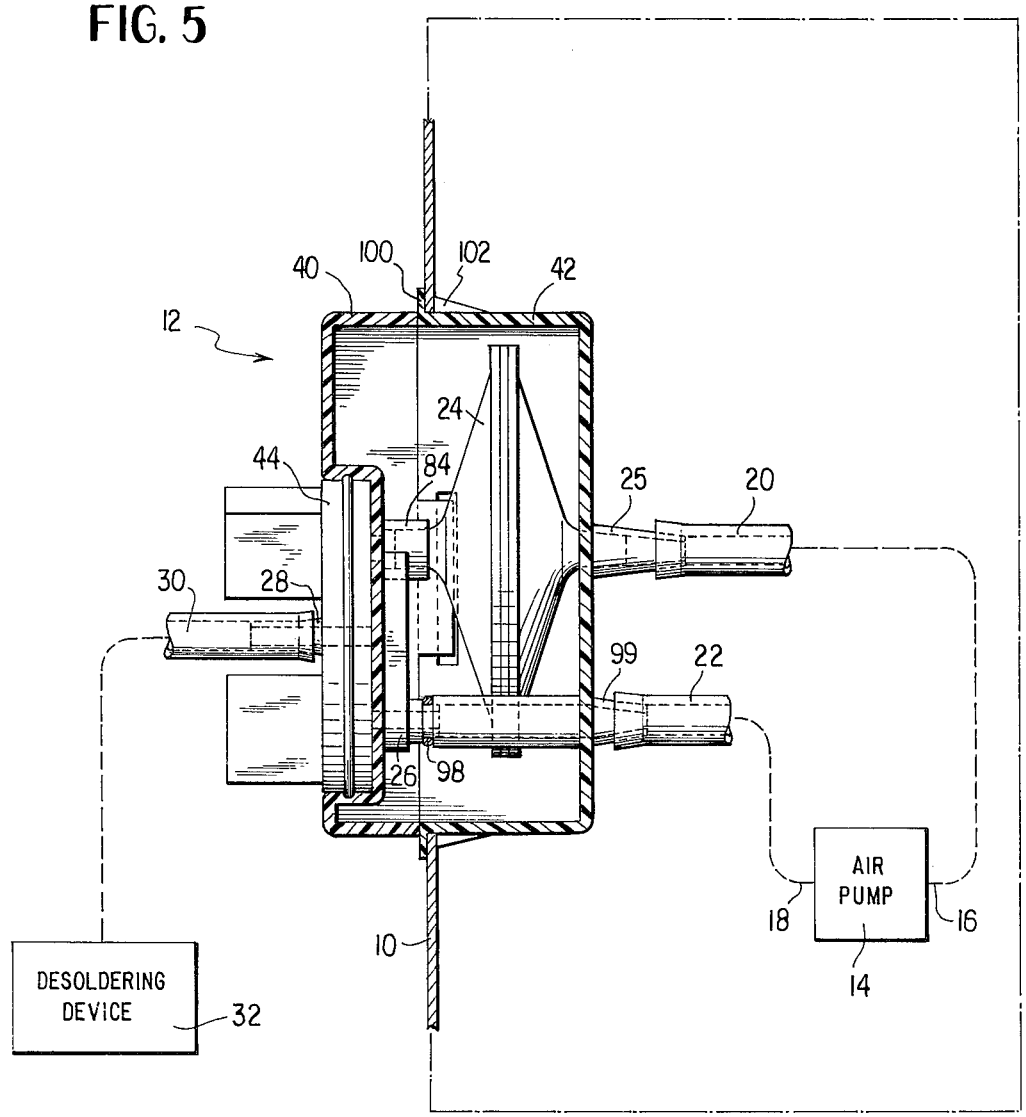

AIR SWITCH AND FILTER COMBINATION

BACKGROUND OF THE INVENTION

The present invention relates generally to fluid flow control systems and improved switching means for use therein, and specifically to air and vacuum switch controls for use in an air flow control system.

In this age of increasingly complex miniaturization, it is necessary to electrically connect and disconnect very small devices from printed circuit boards, etc. Where, in the past, a soldering iron was sufficient, it has been found that there is a need for a device which will not only melt the solder which makes the electrical connection but also to withdraw the excess solder from the area of the connection. Such a device, used both in the manufacture and repair of electrical devices, is the desoldering iron.

The desoldering iron has an air connection as well as the conventional soldering iron heating element. The air connection is connected to a very small aperture at the end of the desoldering iron such that once solder is melted, a vacuum applied to this air line will cause the melted solder to be sucked up through the aperture into an internal cavity in the desoldering device. In some instances, it is desirable to blow excess solder away from the connection and if an air pressure supply is connected to the air passageway, the force of air rushing out of the tip aperture serves to displace any dust, molten solder or the like from the vicinity.

It can be seen that it is desirable to be able to quickly change from a vacuum being applied to the desoldering device to a pressure being applied to the desoldering device. Additionally, it is desirable to be able to vary the pressure level applied to the desoldering device between some minimum and maximum amount. Furthermore, if a single pump is being utilized to supply both vacuum and pressure, it is desirable to operate the pump in as low a load condition as possible, i.e. when the air pressure outlet is connected to the desoldering device, the vacuum outlet of the pump is vented and vice versa. Additionally, when switching between vacuum and the air pressure position, it is desirable that both the pressure and vacuum be vented to prevent inadvertent loading of the pump.

Such a switch is disclosed and shown in U.S. Pat. No. 4,070,856 to Litt issued Jan. 31, 1978. The air flow switch disclosed in the Litt patent meets all of the above stated objects. However, it will be noted by reference to FIG. 2 and others that there are a number of separate parts which make up the switch requiring a rather expensive manufacture and assembly process.

Obviously, when the desoldering device is utilized in the vacuum mode, debris and dust are sucked into the vacuum pump causing increased wear thereon. Most systems require that an air filter be utilized between the air switch and the vacuum outlet of the pump in order to prevent excess pump wear. However, it has been found that in many instances, desoldering device operators will, when faced with a dirty filter, merely take out the filter and connect the switch directly to the pump outlet with a piece of tubing causing the above noted pump defects.

SUMMARY OF THE INVENTION

It is an object of the present invention to overcome the above and other disadvantages in the prior art by providing an air switch with two main moving parts (excluding seals) which will control the application of vacuum or a variable pressure to a utilization device from a pump or pumps having a vacuum and pressure outlet.

It is a further object of the present invention to provide such a switch which can be changed over quickly and easily from the vacuum to the pressure mode of operation as well as from the pressure to the vacuum mode of operation.

It is a still further object of the present invention to provide a switch as noted above which when in the pressure mode of operation can vary the pressure delivered to the utilization device between a minimum and maximum amount.

It is an additional object of the present invention to provide a switch having a minimum number of moving parts which connects vacuum and pressure outlets from a pump to a utilization device, which will controllably connect one or the other of said outlets to said utilization device and will vent the unconnected outlet and thus avoid loading the pump motor.

It is an additional object of the present invention to provide an air switch connecting the utilization device to air pump and vacuum pump outlets and controllably select one of said outlets for connection to said utilization device, and to ensure that both pump outlets are vented when the switch is in a neutral position between the vacuum and pressure positions so as to prevent loading of the pump motor during transition from one switch position to another.

It is a still further object of the present invention to provide an air pressure control switch which will cease all operation in the event that the air filter is not properly located and which will discourage the by-passing of the air filter by the utilization device operator.

The above and other objects are achieved by providing a hollow switch body having vacuum and pressure connection ports. The hollow body has a recess defined in an exterior wall of the body and first and second passages connect the vacuum and pressure connection ports to the recess, respectively. A switching member is rotatably received in the recess with the switching member having an exterior wall and an output device connection port located thereon. There is a passage connecting the output device connection port to the interior wall of the switching member such that the switching member and the switch body comprise an air switch for controllably varying the pressure to the output device when in the pressure mode and for applying vacuum to the output device when in the vacuum mode and further preventing the vacuum and/or pressure pump from being unduly loaded during either mode of operation or when switching between modes of operation. In one embodiment, the first passage connects the recess to the interior of the hollow switch body and said body has a vacuum aperture located therein. The pump filter includes a male member which is insertably connectable into the switch body vacuum aperture thereby making the vacuum connection with the pump such that if the filter is removed, vacuum cannot be applied to the output device and there are no fittings upon which a tube can be mounted to by-pass the filter's operation.

BRIEF DESCRIPTION OF THE DRAWINGS

A more complete appreciation of the invention, and many of the attendant advantages thereof, will be readily apparent by reference to the accompanying drawings, wherein:

FIG. 1 is side view partially in section of one embodiment of the present invention illustrating a typical installation and utilization of the invention;

FIG. 5 is a side view partially in section of a preferred embodiment of the invention with the filter enclosed within the switch case.

DETAILED DESCRIPTION OF PREFERRED EMBODIMENTS

Figure 2A:
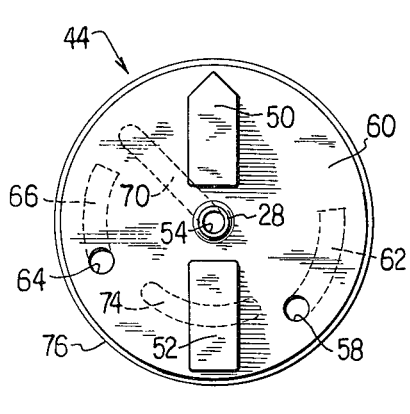
FIGS. 2A, 2B and 2C are exterior wall, side, and interior wall views of the switching member utilized in the present invention.

Referring now more particularly to the drawings, wherein like numerals represent like elements throughout the several views, FIG. 1 illustrates a cabinet 10 in which a switch 12 is mounted. Additionally, an air pump 14 having a vacuum outlet port 16 and a pressure outlet port 18 is also located in cabinet 10. Tubing 20 and 22 connects the vacuum and pressure ports 16 and 18 to air filter 24 and pressure connection port 26. An output device connection port 28 is connected through tubing 30 to the utilization device, in this instance desoldering device 32.

Switch 12 is comprised of an external body half 40, an internal body half 42 and a switching member 44. Certain details of the switching member 44 may be seen in FIGS. 2A, 2B and 2C. It should be noted that for clarity, only selected phantom lines have been retained. In one embodiment, molded segments 50 and 52 provide a means for gripping the switching member while at the same time providing a pointer to indicate the switch's mode of operation. It can be seen that output device connection port 28 has a first member passage 54 which connects the interior wall 56 with the utilization device attached to connection port 28. A second member passage 58 connects exterior wall 60 with the interior wall 56 and serves to vent at least a portion of the interior wall to the atmosphere. The second member passage 58 is connected with a partially circularly extending channel 62 shown in phantom lines on FIG. 2B whose depth gets increasingly shallower as the channel progresses in the circular direction. As will be seen, this channel acts as a vent to vary the amount of air pressure vented to the atmosphere. A third member passage 64 also connects exterior wall 60 and interior wall 56 and serves as a vent to the atmosphere of the vacuum side of the air control system. A further at least partially circularly extending channel 66 is located on the interior wall 56 of the switching member and is in fluid communication with the third member passage 64. To avoid a proliferation of phantom lines, this channel, in a preferred embodiment having a constant depth, is not shown in FIGS. 2A or 2B.

Figure 2B:
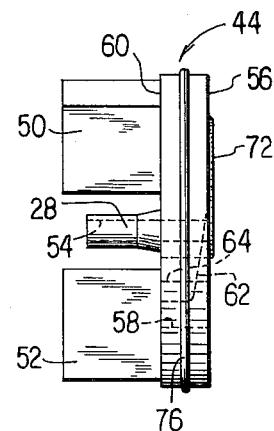
Figure 2C:
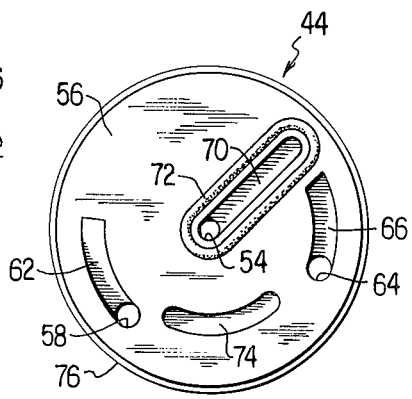

The switching member also includes a single radially extending channel 70 located on the interior wall 56 of the switching member. This channel is in fluid communication with the first member passage 54 and, in a preferred embodiment, has a constant depth. Again, for clarity, phantom lines indicating this channel have been omitted from FIGS. 2A and 2B. As will be later understood, it is important that the channels and vents on the interior wall seal against the exterior wall of the recess in the switch body. Therefore, in a preferred embodiment, a groove is provided around channel 70 and first member passage 54 and an O-ring seal 72 is located therein. This seal flexibly protrudes very slightly from interior wall 56 as can be seen in FIG. 2B and forms an intimate air-tight seal with the switch body. Finally, a fourth channel 74, at least partially circularly extending, is located on the interior wall of the switching member although phantom lines representing this channel have been omitted from FIGS. 2A and 2B. In a preferred embodiment, this channel is of constant depth and serves to accommodate a protrusion from the exterior wall of the recess and comprises a means for limiting rotational movement of the switching member. Finally, in a preferred embodiment of the switching member, a circumferential ridge 76 is provided on the surface connecting the interior and exterior walls. This ridge will cooperate with a similar circumferentially extending groove in the side wall of the recess on the switch body and serves to seal and retain the switching member in the switch body.

Figure 3A:
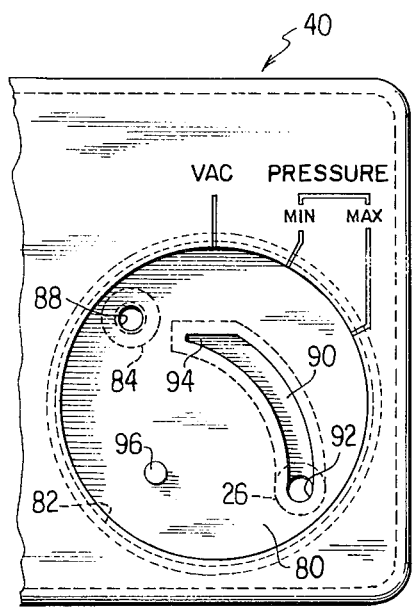
FIGS. 3A, 3B, and 3C are exterior wall, side (partially in section), and interior wall views of a portion of the switch body in accordance with the present invention.
Figure 3B:
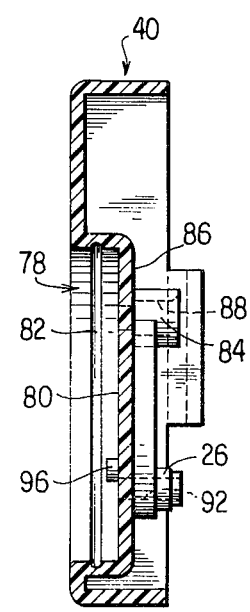
Figure 3C:
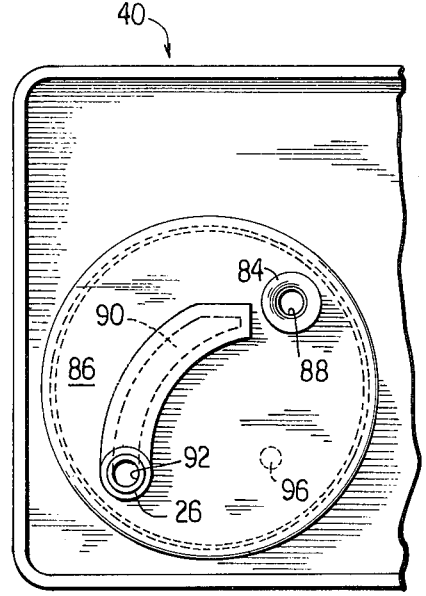

By reference to FIGS. 3A, 3B and 3C, the details of the switch external body half 40 can be seen. A recess 78 is provided in the exterior wall 80 of body half 40, said recess having a dimension such that switching member 44 can be rotatably received therein. In a preferred embodiment, the previously mentioned circumferentially extending ridge 76 on the switching member fits into circumferentially extending groove 82 in the side wall of recess 78. The interaction between the circumferentially extending ridge and groove provides a seal between the switching member and the switch body and also serves to retain the switching member in the switch body recess 78. A vacuum connection port 84 is located on an interior wall 86 of the external body half 40. A first body passage 88 connects the recess exterior wall 80 to the vacuum connection port 84. An at least partially circularly extending channel 90 is located on the external surface of recess 78. One end of channel 90 is in communication with pressure connection port 26 by means of the second body passage 92. It can be seen from FIG. 1 that pressure connection port 26 through a molded connection is in fluid communication with tubing 22 and pressure outlet port 18 of air pump 14. The other end of channel 90 has a restricted cross-sectional area portion 94 which in FIG. 3A can be seen as having a narrowed portion. Channel 62 in switching member 44 could have a constant depth and a narrowing width and still operate in the proper manner. Conversely, the constricted cross-sectional area of portion 94 of channel 90 could have a constant width and a variable depth to effect the same constriction in cross-sectional area. Any combination of width and depth could be used in constricted cross-sectional area portion 94 of channel 90 and in channel 62 and still operate in accordance with the present invention. However, one preferred embodiment of the present invention has the construction as illustrated. Finally, a protrusion 96 extends from the exterior wall of recess 78 and fits in the fourth channel 74 previously described with regard to the switching member 44. The operation and interrelationship of the ports, vents and channels in the switching member and the switch body will be more clearly understood by reference to FIGS. 4A, 4B, 4C, and 4D as follows.

In FIGS. 4A through 4D, the switching member 44 is illustrated in its operational location in recess 78 of the external body half 40. The external body half has various legends thereon "VAC", and "PRESSURE" with sub-legends "MIN" and "MAX". Only a portion of gripping means 50 is shown in these figures to indicate the operational relationship between switching member 44 and the external body half 40. Apertures or passages extending through the switching member are shown in solid circles and channels in the interior wall 56 of the switching member are shown in dashed lines. Channels, apertures and protrusions in or from body portion 40 are shown in dotted lines. It can be seen as the switch is rotated from the vacuum mode of operation in FIG. 4A to the maximum pressure mode in FIG. 4D that protrusion 96 serves as a stop at the ends of channel 74.

Figure 4A:
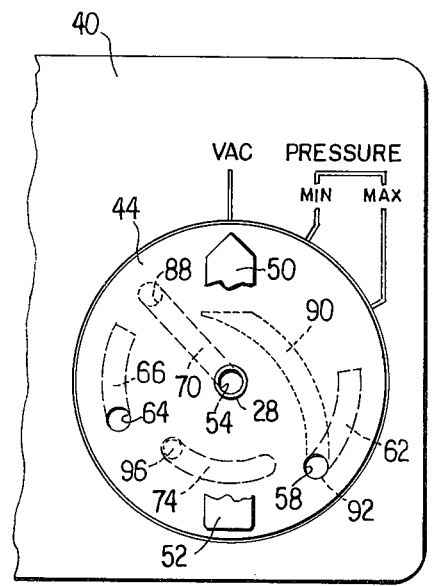
FIGS. 4A, 4B, 4C and 4D are exterior wall views of the switching member and the switch body in vacuum, transition between vacuum and pressure, minimum pressure, and maximum pressure positions showing the interrelationship of the various vents and passageways in the switching member and the switch body recess.

In FIG. 4A with molded segment 50 indicating the switch is in the vacuum position, it can be seen that output device connection port 28 is connected to the vacuum connection port 84 through first member passage 54, radially extending channel 70 and first body passage 88. Although in a preferred embodiment, the vacuum connection port 84 is open to the internal area of the switch body, it could be connected directly to air filter 24 and the internal half of the switch body dispensed with as long as tubing 22 directly connects the pressure connection port 26 and the pressure outlet port 18. However, in the illustrated embodiment, the air filter 24 is merely inserted into a vacuum aperture 25 in the internal body half 42. It will be noted that it is impossible to directly connect tubing 20 to the aperture 25 without the presence of air filter 24.

While the output device connection port is directly connected to the vacuum outlet port such that vacuum is applied to the desoldering device 32, it is desirable that there be no load on the pressure side of the air pump 14 (in order to obtain maximum pump performance in the vacuum mode). Therefore, it will be seen that the pressure outlet port 18 of the pump is connected through the second body passage 92 to the second member passage 58 which is a vent to the atmosphere. Thus, the pressure side of the pump is completely vented minimizing any pressure load and maximizing pump performance on the vacuum side.

Figure 4B:
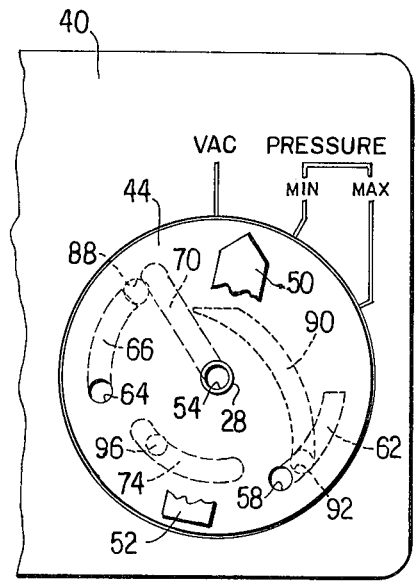

FIG. 4B shows the switching member rotated to a position between the vacuum and pressure positions. To avoid overloading the air pump motor, it is desirable that neither the vacuum nor pressure outlet ports be blocked during transition from vacuum to pressure or vice versa. It can be seen that radially extending channel 70 slightly overlaps the first body passage at the position shown in FIG. 4B. At the same time, the third partially circularly extending channel 66 in the switch member begins to overlap the first body passage 88 thus beginning to vent vacuum to the atmosphere through third member passage 64. Thus, as the switch body is moved from the vacuum to an intermediate position, the vacuum side of the pump is disconnected from the desoldering device and at the same time connected to a vent in the form of third member passage 64.

The pressure side of the pump is still supplying air under pressure through pressure connection port 26 and the second body passage 92 which then passes through the partially circularly extending channel 62 and is vented through second member passage 58. Thus, in this intermediate position, both the vacuum outlet port 16 and the pressure outlet port 18 are vented to the atmosphere reducing the load on air pump 14.

Figure 4C:
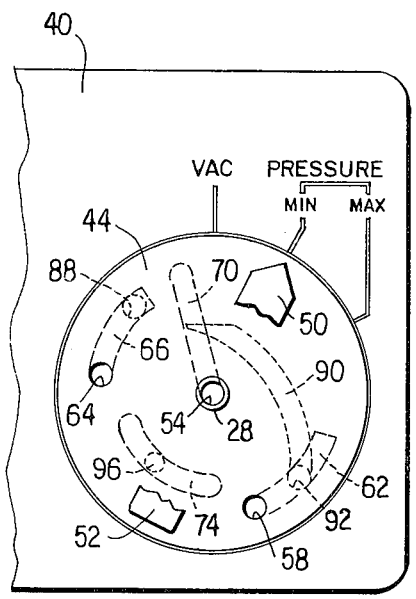

As the switching member is rotated further to the minimum pressure position, FIG. 4C shows that the vacuum side of the pump is fully vented through first body passage 88, to channel 66 and third member passage 64. However, second body passage 92 in the switch body is in alignment with the mid-portion of partially circularly extending channel 62, which as is seen in FIG. 2B, has a gradually reduced cross-sectional area. Thus, there will be some restriction to flow from the pressure side of the pump through second body passage 92 into the partially circularly extending channel 62 and from there out the vent comprised of second member passage 58. It will be noted that an alternate path for pressurized air to take will be through second body passage 92, through the partially circularly extending channel 90 (and its reduced cross-sectional area 94) into radially extending channel 70 to first member passage 54 and from there to the output device connection port 28. Although there is greater flow resistance along this alternate path for air flow, a small amount of air pressure is felt at the desoldering device which is connected to the output device connection port 28. Therefore, a minimum amount of pressure would indeed be transmitted with the excess air flow (on the pressure side) and all of the vacuum side output of the pump being vented to atmosphere.

Figure 4D:
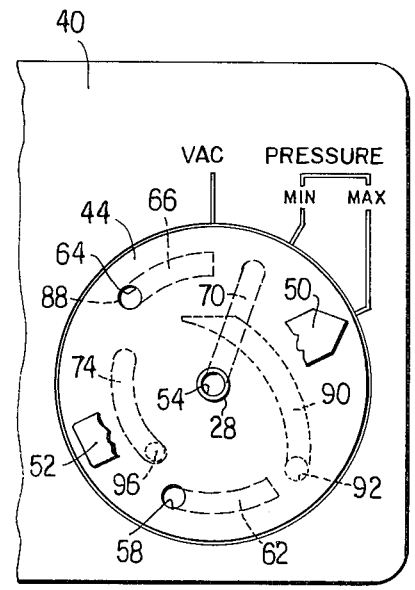

When the switching member has been turned clockwise to the maximum pressure position and has reached the limit defined by protrusion 96 and fourth channel 74, the vacuum side still remains vented directly to the atmosphere from the vacuum connection port 84, through first body passage 88, and out third member passage 64. However, second body passage 92 is out of proximity with channel 62 requiring that all pressurized air travel along channel 90. The radially extending channel 70 now overlaps an unconstricted portion of channel 20 allowing a minimum resistance to the free flow of pressurized air through the second body passage 92, channel 90, channel 70 and out through the output device connection port 28. Thus, the maximum air pressure is provided the desoldering device 32 and the vacuum side remains vented to the atmosphere reducing the load on the pump (FIG. 4D).

It can be seen that as the switch is moved from the "MIN" to the "MAX" pressure position, second body passage 92 will be in proximity to an increasingly shallow channel 62. This increasingly shallow channel provides more and more resistance to air pressure flowing through channel 62 and out vent 58 while at the same time, channel 70 overlaps more and more the constricted portion of channel 90 providing less and less flow resistance. Thus, any desired pressure between the minimum and maximum amounts can be easily set by the operator setting the switching member to the desired level between "MIN" and "MAX".

It can be seen that the present invention with one moving part and in a preferred embodiment with one O-ring seal, selectively connects vacuum and pressure outlets of an air pump to a utilization device such that the pump is never loaded at both the vacuum and pressure ends at the same time, thus, preventing possible motor and bearing burnout in the pump. In the embodiment just described, the fluid being controlled is air but applicant's device would be just as useful with other fluid mediums. The construction material of the pump would to a certain extent be dictated by the type of fluid to be controlled although nylon would appear to be advantageous in the air flow control embodiment. Although the output utilization device is identified as desoldering device 32, applicant's invention is equally applicable to other devices where a reversable and/or variable pressure fluid supply is desirable. Furthermore, applicant's device is uniquely designed so as to preclude operation without air filter 24 properly installed. However, in some instances, it may be undesirable to include this feature while still utilizing the applicant's inventive switch assembly. Additionally, should variable vacuum be desirable, it can be seen that location of the switch in a position between that shown in FIG. 4A and that shown in FIG. 4B will provide such a variable vacuum.

FIG. 5 illustrates a further preferred embodiment in which the air filter 24 is included within the switch body. Here the connection between vacuum connection port 84 and vacuum aperture 25 is made only through the air filter 24. If the filter is not installed, very little vacuum will be supplied from line 20 to connection port 84 (although some vacuum will be felt because the inner volume of the case will be evacuated to a minor degree and the connection port 84 opens into the inner volume). Vacuum hose 20 connects to the protrusion from the case which includes the vacuum aperture 25. In a further modification, pressure connection port 26 has a stepped construction to facilitate the use of an O-ring seal 98 to seal the butt joint with pressure aperture 99. Additional details show the mounting and retaining flanges 100 and 102 which hold the internal body half 42 in place in cabinet 10.

Therefore, it is understood that many modifications and applications of the applicant's invention as hereinbefore described will be obvious to those of ordinary skill in the art. The description of the applicant's invention has been with regard to an example and is certainly not limited to those aspects specifically described and discussed. Therefore, the applicant's invention is limited only in accordance with the appended claims.

The embodiments of the invention in which an exclusive property or privilege is claimed are defined as follows:

1. An air switch for controllably connecting outputs of vacuum and pressure pumps to an output utilization device, said switch connecting either the vacuum output or the pressure output to said output utilization device, said switch controllably varying the pressure to said output utilization device when connecting said pressure output to said utilization device, said switch further comprising means for ensuring that at least one of said vacuum output and said pressure output are vented to the atmosphere either during switching or during variable pressure operation, said switch comprising:
   a switch body having vacuum and pressure connection ports;
   means defining a recess in said switch body, said recess having a wall;
   first body passage means communicating from said vacuum connection port to said recess;
   second body passage means communicating from said pressure connection port to said recess;
   a switching member having interior and exterior walls, said interior wall located towards and in said recess, said switching member rotatably receivable in said recess, said switching member exterior wall having an output device connection port located thereon;
   a first member passage means communicating from said output device connection port to said interior wall; and
   said switching member and said switch body comprising said means for ensuring.

2. The air switch in accordance with claim 1, wherein said switching member is rotatable at least between a vacuum position and minimum and maximum pressure positions, wherein said first member passage means includes at least a partially radially extending channel on said interior wall, said radially extending channel communicating with said vacuum connection port through said first body passage means when said switching member is in said vacuum position; and
   said second body passage means includes a first at least partially circularly extending channel on said recess wall communicating with said radially extending channel when said switching member is in said pressure position.

3. An air switch in accordance with claim 2, wherein said switching member includes a second at least partially circularly extending channel, said second channel gradually decreasing in depth from one end to the other, said switching member further including a second member passage means connecting said second channel end having the greatest depth to the exterior wall of said member, said second member passage means located such that when said switching member is in said vacuum position, said first at least partially circularly extending channel overlies said second member passage means; when said switching member is in said minimum pressure position, said first channel overlies a lesser depth portion of said second channel; and when said switching member is in said maximum pressure position, said first channel is not in communication with said second channel.

4. The air switch according to claim 3, wherein said switching member further includes:
   a third at least partially circularly extending channel on said member interior wall; and
   a third member passage means for fluid communication between said third channel and said exterior wall, said third channel in fluid communication with said first body passage means when said switching member is in one of said pressure positions and said third channel is not in fluid communication with said first body passage means when said switching member is in said vacuum position.

5. The air switch in accordance with one of claims 1 through 4, wherein said member interior wall and said recess wall include means for limiting rotational movement of said switching member relative to said switch body.

6. The air switch according to claim 5, wherein said limiting means comprises a protrusion from said recess wall and a corresponding fourth channel on said member interior wall, said protrusion extending into said fourth channel and thereby limiting rotation of the switching member to the arcuate length of said fourth channel.

7. An air switch according to one of claims 1 through 4 wherein said switch further includes means for sealing said switching member to said switch body and for retaining said switching member in said recess.

8. An air switch in accordance with claim 7, wherein said sealing means comprises a circumferential ridge on said switching member and a corresponding circumferential groove in said recess, said ridge fitting into said groove upon assembly of said switching member into said switch body recess.

9. An air switch in accordance with one of claims 2 through 4, wherein said at least partially radially extending channel includes an O-ring sealing means therearound.

10. An air switch in accordance with one of claims 1 through 4, wherein said switching member includes grip means for enabling an operator to change switch position.

11. An air flow control system comprising:

an air pump having a vacuum outlet port and an air pressure outlet port;

an air utilization device;

an air switch connecting either said vacuum outlet port or said pressure outlet port to said air utilization device, said switch controllably varying air pressure to said device when connecting said pressure outlet port to said device, said switch comprising:

a switch body having a vacuum aperture therein;

an output device connection port, connected to said air utilization device;

a vent port;

a vacuum connection port open to the interior of said switch body;

an air pressure connection port connected to said air pump pressure outlet port;

means defining a recess in said switch body;

first body passage means communicating from said vacuum connection port to said recess;

second body passage means communicating from said air pressure connection port to said recess;

a switching member having interior and exterior walls, said interior wall located towards and in said recess on said switch body, said switching member rotatably receivable in said recess, said switching member exterior wall connected to said output device connection port;

a first member passage means communicating from said output device connection port to said interior wall;

said switching member and said switch body comprising a means for preventing said air pump from being loaded during either switching or in variable pressure operation; and an air filter having two ports, one of which is connected to said air pump vacuum outlet port and the other of which is inserted into said vacuum aperture, said filter comprising the only connection between said vacuum outlet port and said vacuum aperture.

12. An air flow control system comprising:

an air pump having a vacuum outlet port and an air pressure outlet port;

an air utilization device;

an air switch connecting either said vacuum outlet port or said pressure outlet port to said air utilization device, said switch controllably varying air pressure to said device when connecting said pressure outlet port to said device, said switch comprising:

a switch body having a vacuum aperture therein;

an outlet device connection port, connected to said air utilization device;

a vent port;

a vacuum connection port;

an air pressure connection port connected to said air pump pressure outlet port;

means defining a recess in said switch body;

first body passage means communicating from said air pressure connection port to said recess;

a switching member having an interior and exterior walls, said interior wall located towards and in said recess on said switch body, said switching member rotatably receivable in said recess, said switching member exterior wall connected to said output device connection port;

a first member passage means communicating from said output device connection port to said interior wall;

said switching member and said switch body comprising a means for preventing said air pump from being loaded during either switching or in variable pressure operation; and an air filter within said air switch body, said filter having two ports, one port connected to said vacuum connection port and the other port connected to said vacuum aperture, said filter comprising the sole means of fluid connection port and said vacuum aperture.

* * * * *